United States Patent [19]

Olashaw et al.

[11] 4,374,405
[45] Feb. 15, 1983

[54] INSULATING-ISOLATING BARRIER SYSTEM FOR ELECTRICAL DISTRIBUTION EQUIPMENT BUSWORK

[75] Inventors: William F. Olashaw, Plainville; James H. Postlethwait, Weatogue, both of Conn.

[73] Assignee: General Electric Company, New York, N.Y.

[21] Appl. No.: 214,852

[22] Filed: Dec. 10, 1980

[51] Int. Cl.³ .......................... H02B 1/14; H02B 1/20
[52] U.S. Cl. .................................... 361/355; 361/361; 361/378; 174/71 B
[58] Field of Search ............... 361/341, 342, 346, 353, 361/355, 356, 358, 361, 363, 378, 429; 307/147; 339/22 B; 174/68 B, 70 B, 71 B, 72 B, 88 B, 99 B, 129 B, 133 B, 149 B

[56] References Cited

U.S. PATENT DOCUMENTS

| 3,924,161 | 12/1975 | Olashaw | 174/71 B |
| 4,242,718 | 12/1980 | Shariff | 361/361 |
| 4,288,656 | 9/1981 | Olashaw | 361/361 |
| 4,298,771 | 11/1981 | Olashaw | 361/355 |

Primary Examiner—G. P. Tolin
Attorney, Agent, or Firm—Richard A. Menelly; Walter C. Bernkopf; Fred Jacob

[57] ABSTRACT

A barrier system includes elongated, insulative, high impact resistant isolating barrier members clamped in semi-embracing relation with the horizontal bus runs in an electrical switchboard and the like. These horizontal bus runs are interrupted by bus joints electrically connecting them with riser bus; these joints being isolated by an enclosure comprising an insulative collar and a removable, insulative cover. The barrier members, joint enclosures, and insulative barrier panels and support bases isolating the riser bus all cooperate to afford an essentially impenetrable barrier protecting the buswork and preventing inadvertent human contact therewith.

5 Claims, 21 Drawing Figures

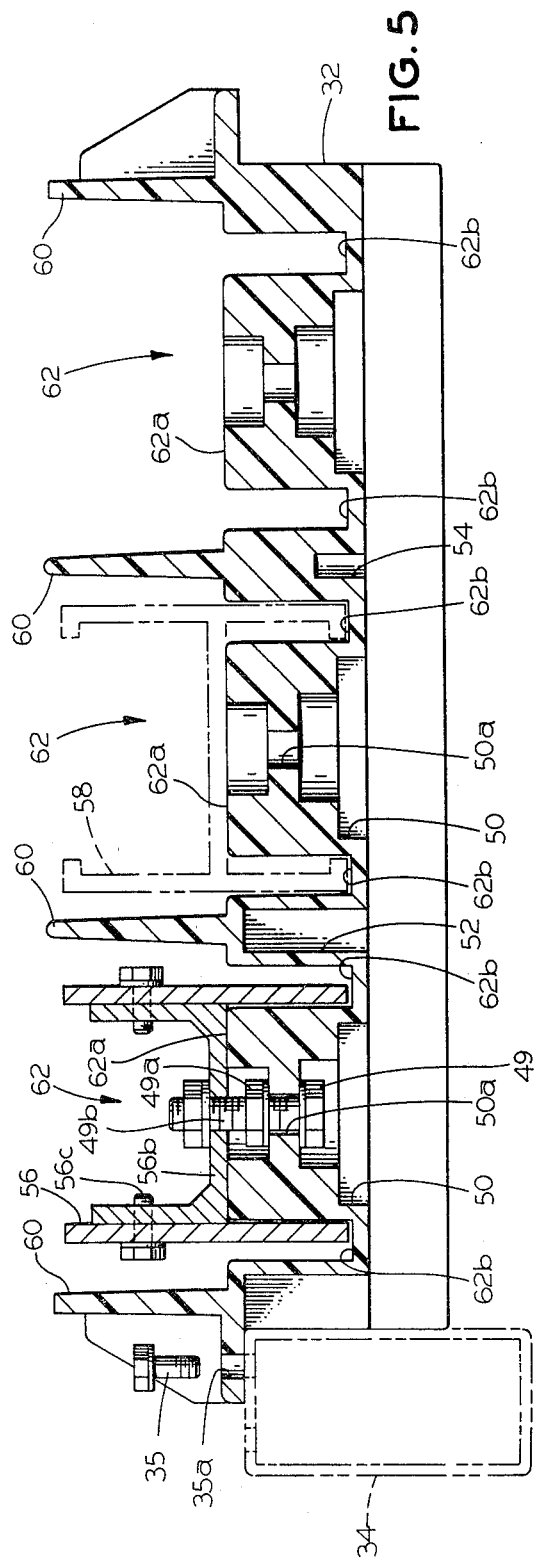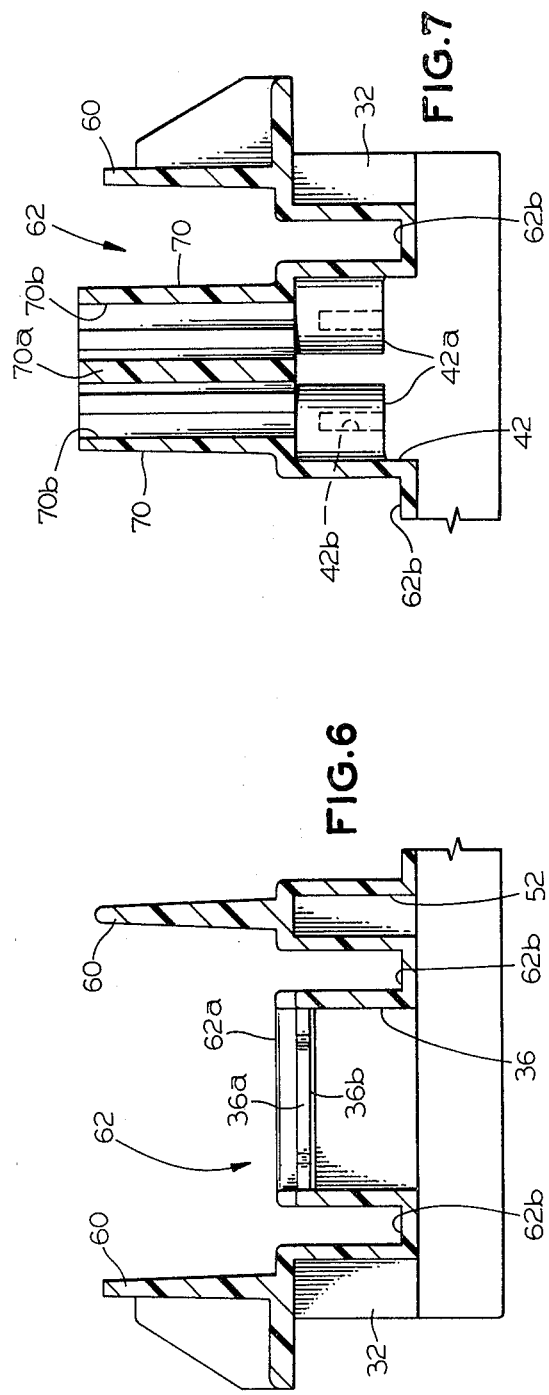

4,374,405

INSULATING-ISOLATING BARRIER SYSTEM FOR ELECTRICAL DISTRIBUTION EQUIPMENT BUSWORK

BACKGROUND OF THE INVENTION

The present invention relates to electrical distribution equipment and particularly to an insulating-isolating barrier system for the buswork thereof.

In the interests of safety, it is most desirable to isolate the busbars of switchboards, switchgear, and the like from inadvertent contact, either by humans or foreign objects. Obviously human contact with these live parts can result in fatal electrocution. Of equally hazardous consequences are those situations where a foreign metal object, such as a wrench, is inadvertently dropped onto live bus or left in contact with the bus when voltage is applied. Such happenstances can and often do create a phase-to-phase fault accompanied by explosive arcing injurious to personnel standing by.

It is accordingly an object of the present invention to provide an insulating-isolating barrier system for the live parts of electrical distribution equipment.

A further object is to provide a barrier system of the above character wherein components thereof may be readily removed for inspection and maintenance.

Another object is to provide a barrier system of the above character which is effectively impenetrable from without and yet accommodates effective convection cooling of certain current carrying parts.

An additional object is to provide a barrier system of the above character wherein the components thereof are readily fabricated and convenient to assemble.

Other objects will in part be obvious and in part appear hereinafter.

SUMMARY OF THE INVENTION

In accordance with the present invention, there is provided a barrier system for insulating-isolating live parts of electrical distribution equipment in the form of switchboards, switchgear, and the like. Included in this system is a vertical array of modular insulative bases assembled to the equipment frame and providing a plurality of side-by-side channels in which riser busbars are individually accommodated and supported. These bases also serve as rear barrier walls for cubicles accommodating electrical devices fed from the riser bus.

Insulative barrier panels, secured to the bases, close off these channels to isolate the riser bus therein. Apertures in these panels access the individual riser busbars for bus joint electrical connection with respective busbars of plural horizontal bus runs. To isolate these bus joints there is provided insulative enclosures, each consisting of a collar and a mating cover. Cooperating with these joint enclosures are elongated, high impact resistant, insulative barrier members clamped in semi-embracing relation with the horizontal bus runs extending between bus joints to thus provide an essentially impenetrable barrier for the equipment buswork effective in precluding inadvertent contact with these live, current carrying parts by humans and foreign objects.

The invention accordingly comprises the features of construction and arrangement of parts which will be exemplified in the construction hereinafter set forth, and the scope of the invention will be indicated in the claims.

For a better understanding of the nature and objects of the invention, reference should be had to the following detailed description taken in conjunction with the accompanying drawings in which:

DESCRIPTION OF THE DRAWINGS

FIG. 5 is a sectional view taken along line 5—5 of FIG. 3;

FIG. 6 is a sectional view taken along line 6—6 of FIG. 3;

FIG. 7 is a sectional view taken along line 7—7 of FIG. 3;

Corresponding reference numerals refer to like parts throughout the several views of the drawings.

DETAILED DESCRIPTION

Figure 1:
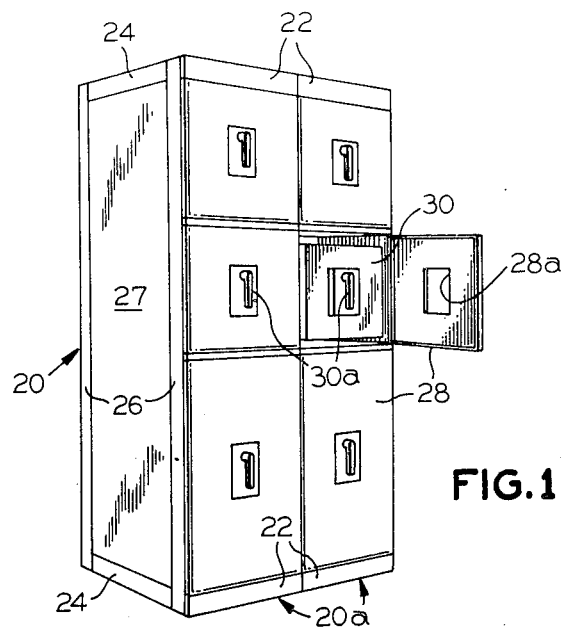
FIG. 1 is a perspective view of an electrical switchgear including a pair of side-by-side vertical sections.
Figure 2:
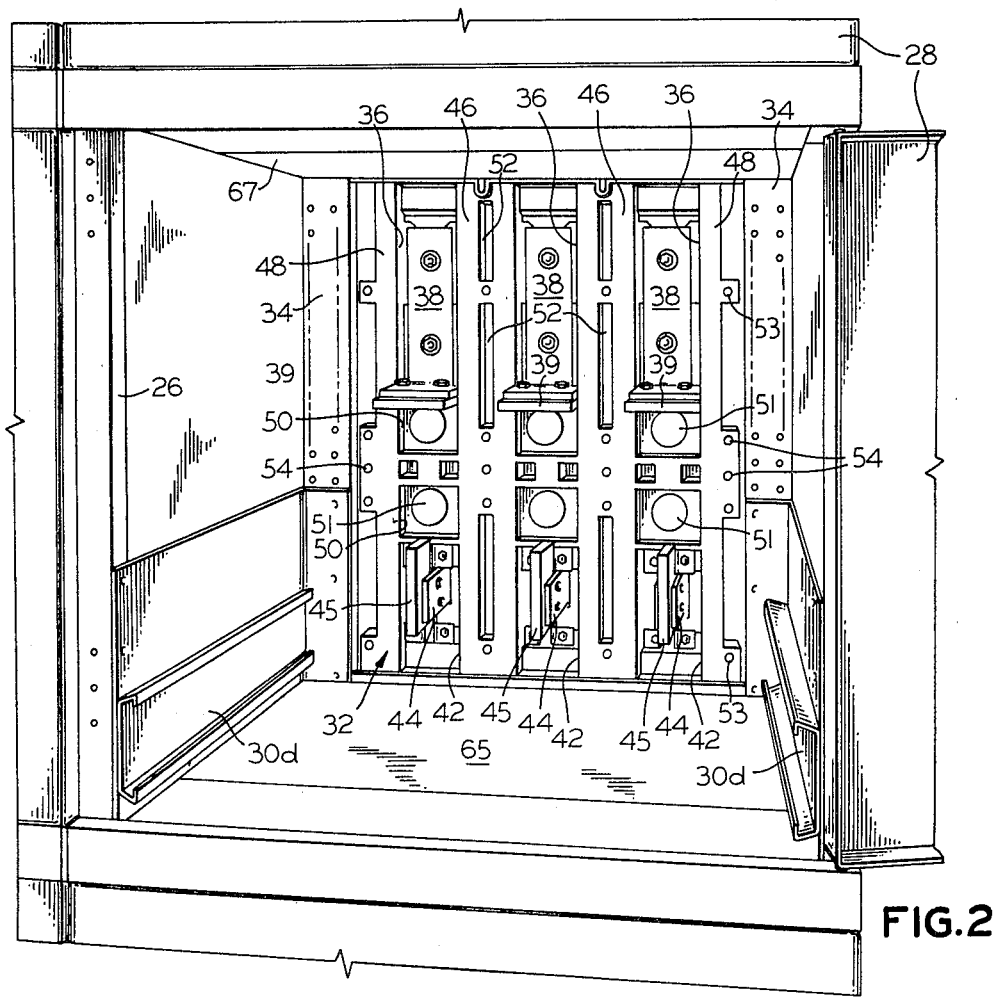
FIG. 2 is a perspective view looking into one of the cubicles of the switchgear of FIG. 1.
Figure 8:
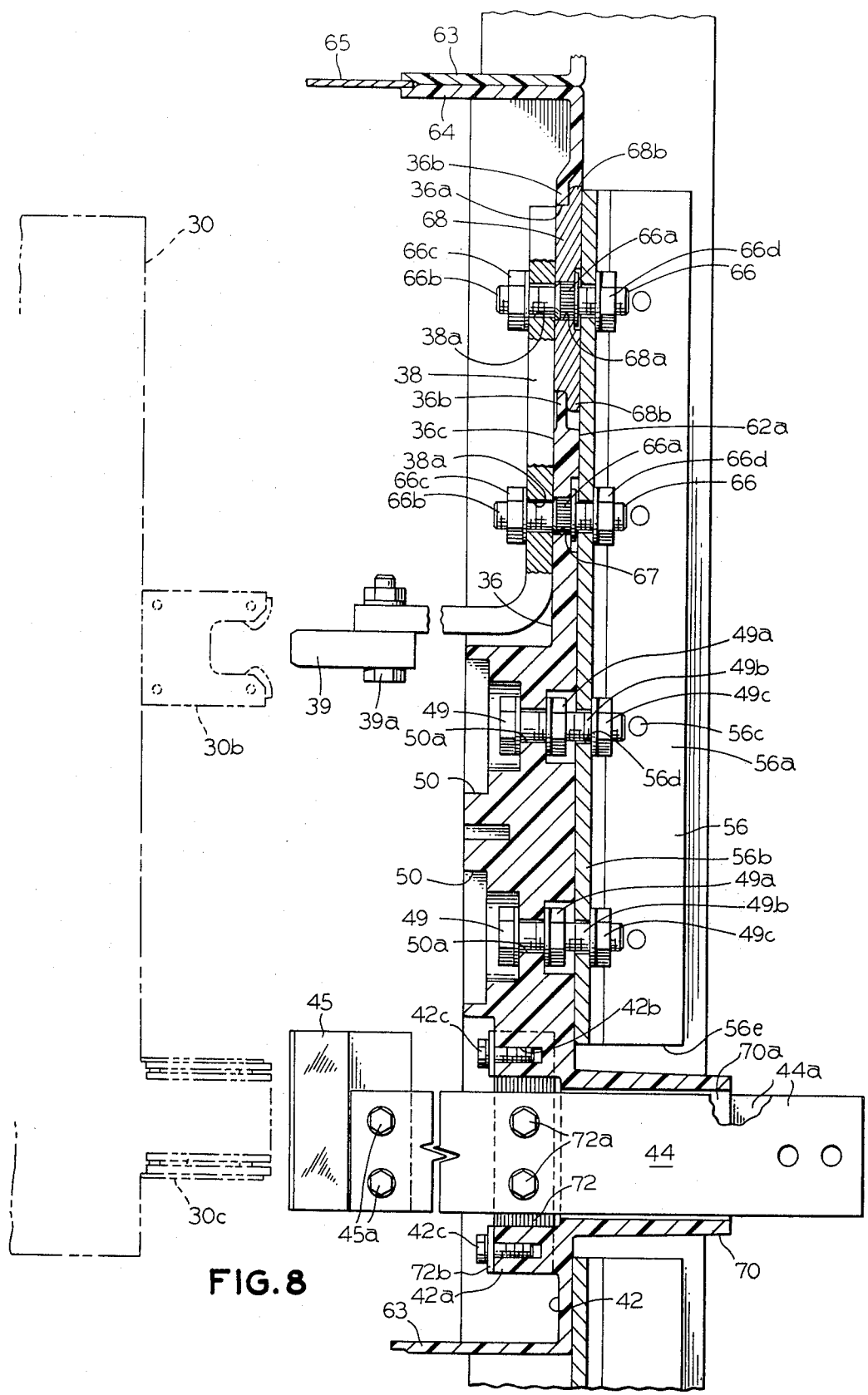
FIG. 8 is a vertical sectional view taken along the centerline of one of the riser busbar channels provided in the rear face of the base of FIG. 3.

The present invention is embodied in an electrical switchgear generally indicated at 20 in FIG. 1 and comprising one or more vertical sections 20a. Each vertical section includes a cubical steel framework consisting of width posts 22, depth posts 24 and vertical posts 26 rigidly joined at the frame corners in mutually perpendicular relation. Secured to these posts are suitable panels, such as side panel 27 seen in FIG. 1, to provide a cubical enclosure, as well as partitions to create individual compartments or cubicles accessed by doors 28 hinged to the vertical posts. Within each cubicle is an electrical device, such as a circuit breaker 30 whose operating handle 30a protrudes through a central opening 28a in the cubicle door. Looking into a representative cubicle of one of the switchgear vertical sections, as seen in FIG. 2, the rear wall thereof is provided by a modular support base, generally indicated at 32, of a structurally rigid, electrically insulative material, such as glass fiber polyester, formed, for example, by a molding process. These bases are mounted in end-to-end vertical relation to vertical stringers 34 by self-tapping screws 35 utilizing vertical patterns of holes 35a preformed in the lateral edge portions of the bases (FIG. 5); the stringers being affixed to the switchgear section framework at an appropriate depth. As seen in both FIGS. 2 and 3, the front face of each base is formed to provide three rectangular, vertically elongated, relatively deep depressions 36, in side-by-side relation for accommodating L-shaped, run-in line straps 38 (FIG. 2) which are respectively electrically connected with separate vertical or riser busbars and, together with these riser busbars, are physically mounted to the base, as will be described in connection with FIG. 8. Also formed in the front side of base 32 in vertical alignment below depressions 36 are side-by-side depressions 42 in which are mounted load-side runbacks 44, as will be detailed in conjunction with FIGS. 8 through 10. The line straps 38 are electrically joined with and physically support separate male stabs 39 using bolts 39a, while the runbacks 44 physically mount and are electrically joined by bolts 45a with separate male stabs 45. These stationary male stabs are disposed to mate with line terminal disconnects 30b and load terminal disconnects 30c of a drawout circuit breaker 30, as seen in FIG. 8; racking movement of the breaker being supported by side rails 30d seen in FIG. 2.

Figure 3:
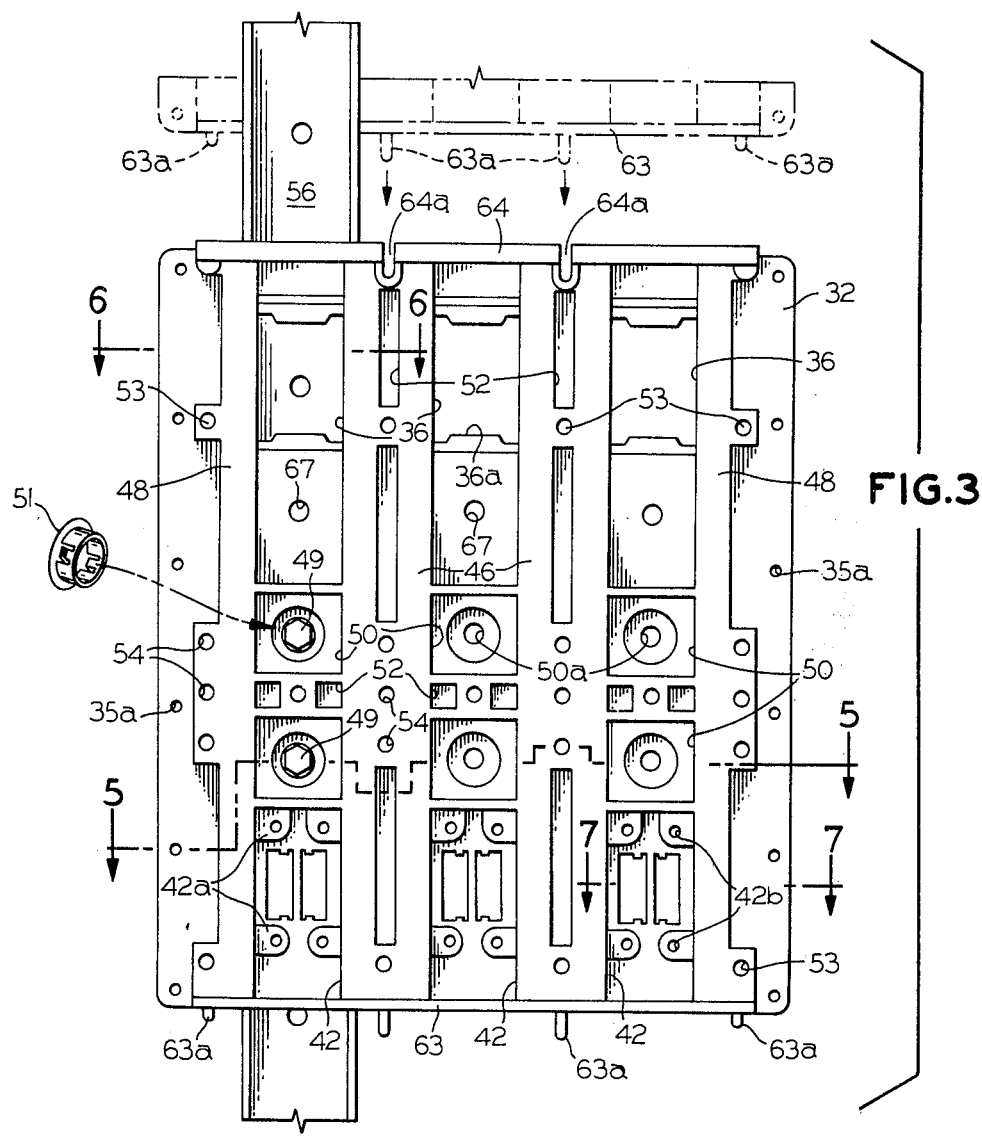
FIG. 3 is a front view of a modular insulative support base utilized in the switchgear of FIG. 1.

Still referring to FIGS. 2 and 3, interphase isolation is provided by the base in the form of a pair of barrier walls 46 separating depressions 36 and 42, while phase to frame isolation is afforded by outboard barrier walls 48. A pair of rectangular wells 50 located between each vertically spaced pair of depressions 36 and 42 serve to recess the heads of bolts 49 securing the riser busbars to the base 32, as also will be seen in connection with FIGS. 5 and 8. The bolt heads, being live, are isolated by caps, one seen at 51 in FIG. 3, which are press-fitted in the countersunk portions of the bolt holes 50a preformed in the base. Rectangular recesses 52 in the front surface of the base constitute coring, while appropriately located, preformed holes 53 may be utilized to mount current transformers (not shown) in embracing relation with either the line straps 38 or the runbacks 44 of each phase. The horizontal pattern of preformed holes 54 may be utilized to secure a transverse brace (not shown) to each base should additional bracing be needed to withstand the extreme electrodynamic forces associated with extraordinarily high levels of shortcircuit fault current.

Figure 11:
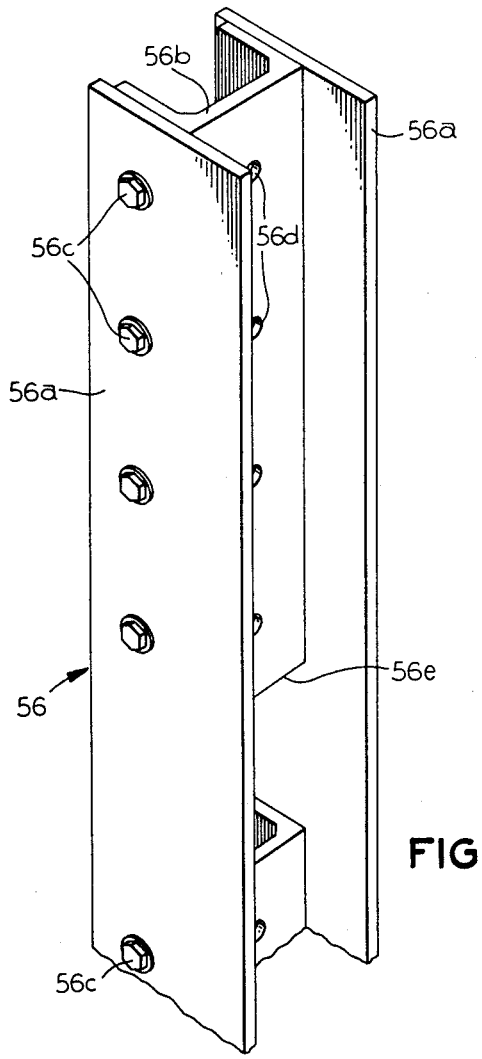
FIG. 11 is a perspective view, partially broken away, of a copper riser busbar utilizable in the switchgear of FIG. 1.
Figure 12:
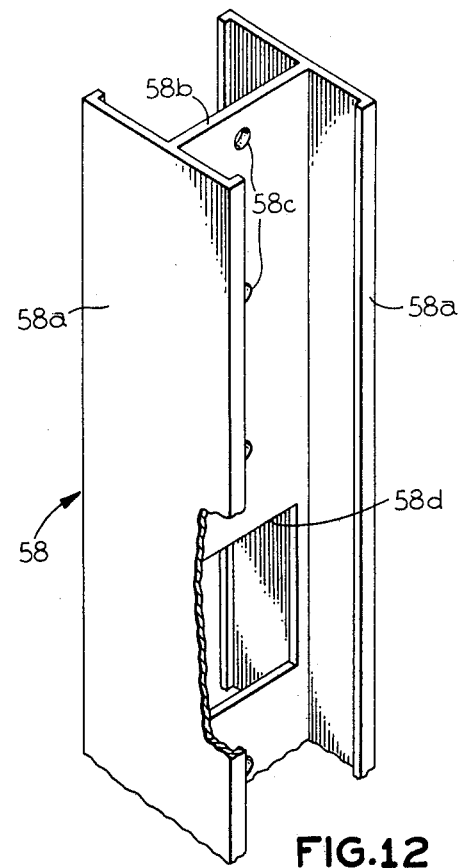
FIG. 12 is a perspective view, partially broken away, of an extruded aluminum riser busbar utilizable in the switchgear of FIG. 1.

As will be described, bases 32, once mounted to the switchgear frame in end-to-end vertical relation, serve to support in parallel, side-by-side, isolated relation typically three vertical or riser busbars, which are seen in FIGS. 11 and 12 to be of H-shaped cross-section. The riser busbar 56 of FIG. 11 is formed of copper with its H-shaped cross-section created by assembling a pair of copper rectangular cross-sectioned bars or flanges 56a to a series of interconnecting U-shaped copper webs 56b utilizing bolts 56c. FIG. 12 depicts an alternative, aluminum busbar 58 extruded in H-shaped cross-section with flanges 58a interconnected by an integral web 58b. As will be seen, a series of holes 56d preformed in the separate webs 56b of each copper riser busbar or the preformed holes 58c in the web of each aluminum busbar are utilized in affixing the riser busbars to the bases 32 and to accommodate bolted joints with line straps 38 (FIGS. 2 and 3). The separations 56e between the copper busbar webs 56b and the openings 58d created in the aluminum busbar web 58b are so located as to accommodate the rearward extension of runbacks 44, as will be described.

Figure 4:
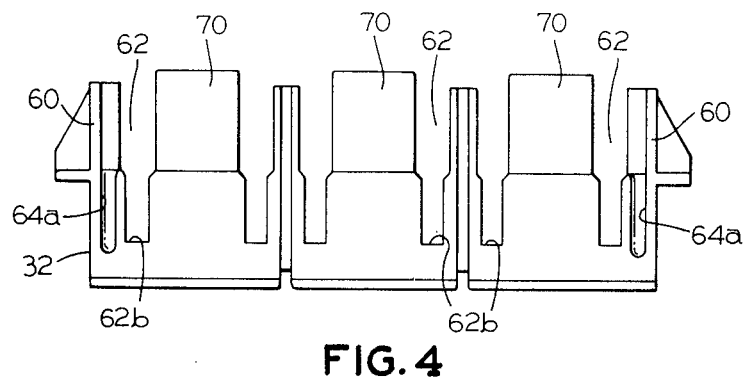
FIG. 4 is an end view of the support base of FIG. 3.

Referring to FIGS. 4 and 5, the back side of each base 32 is integrally formed with four outstanding, vertically extending walls 60 arranged in equally spaced, parallel relation such to define three channels 62 coextensive with the length of each base. When the bases are assembled in vertical, end-to-end relation to stringers 34 (FIG. 2), these channels are continuous for the full height of the switchgear vertical section. In this connection, as seen in FIG. 3, the lower edge of each base is provided with tongues 63a which interfit with grooves 64a created in the upper edge of each base incident to their end-to-end assembly. Also as seen in FIGS. 3 and 8, a transverse wall 64 outstanding from the front side of each base at its upper edge and a transverse wall 63 outstanding from its lower edge cooperate with partitions 65, seen in FIGS. 2 and 8, in fully separating vertically adjacent cubicles.

Returning to FIG. 5, the floor 62a of each channel 62 is formed with a pair of deep, parallel running troughs 62b which receive the forwardly extending portions of the copper busbar flanges 56a or the aluminum busbar flanges 58a depending on which of the H-shaped riser busbars 56 or 58 are laid in the channels. While FIG. 5 shows a copper riser busbar 56 laid in the left channel 62 and an aluminum riser busbar 58 in the center channel, it will be appreciated that for a particular installation the riser bus will either be all copper or all aluminum. The width of the troughs 62b is illustrated as being greater than the flange thickness to show that flanges of increased thickness and greater ampacity can be accommodated. The depth of the troughs 62b is such that the forward edges of the riser bus flanges are spaced from the groove bottoms while the busbar webs rest on the channel floors 62a, as illustrated in FIG. 5. Centrally located in the wells 50 noted in FIGS. 2 and 3 are the preformed through-holes 50a, countersunk from both sides, for accommodating the bolts 49 inserted from the front side of the base (see also FIG. 8). Nuts 49a are then threaded down on the bolt shanks 49b so as to clamp the bolts to the base with their shanks projecting out beyond the floors 62a of their respective channels 62. Thus, when the riser busbars are laid in the channels the bolt shanks 49b project through the preformed holes in the busbar webs. Second nuts 49c are then torqued down on these bolt shanks to securely clamp the riser busbars, either the copper busbars 56 as seen in FIG. 5 or of the aluminum busbars 58, to the bases 32.

In addition to bolts 49, a pair of spline bolts 66 are utilized to further secure each riser bus to the bases 32 and also to support and electrically connect an L-shaped line strap 38 to each riser busbar, which in FIG. 8 is seen to be a copper busbar 56. Thus, one of each pair of spline bolts 66 has its intermediate spline portion 66a swaged into a preformed hole 67 located in the lower portion of each line strap depression 36 formed in the front side of base 32. The other one of each spline bolt pair has its spline portion 66a swaged into a countersunk hole 68a formed in a rectangular copper spacer 68 which is accommodated in a close-fitting opening 36a in the channel floor 62a otherwise separating each front side line strap depression 36 from its associated riser bus channel 62. The upper and lower edges of opening 36a are forwardly offset to create lips 36b (see also FIG. 6) which cooperate with upper and lower spacer projections 68b to seat spacer 68 with its rear surface flush with the channel floor 62a and its front surface flush with the bottom surface 36c of line strap depression 36. The forwardly extending threaded shanks 66b of spline bolts 66 are inserted through holes 38a in line strap 38 and nuts 66c are applied to clamp the line strap to the base and to effect a bolted electrical joint with spacer 68. The rearwardly extending threaded shanks of the spline bolts project through the copper riser bus web holes 56d to receive nuts 66d further clamping the riser bus to the base and effecting a bolted electrical joint with spacer 68.

When aluminum riser busbars 58 are utilized, their electrical joints with the line straps or run-ins may be of a bolted-welded configuration such as disclosed in commonly assigned, U.S. Pat. No. 4,288,656.

Figure 9:
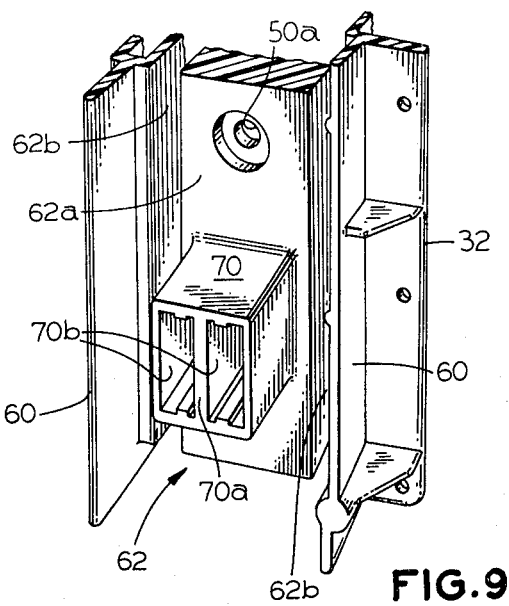
FIG. 9 is a fragmentary perspective view of the runback supporting portion of the base of FIG. 3.
Figure 10:
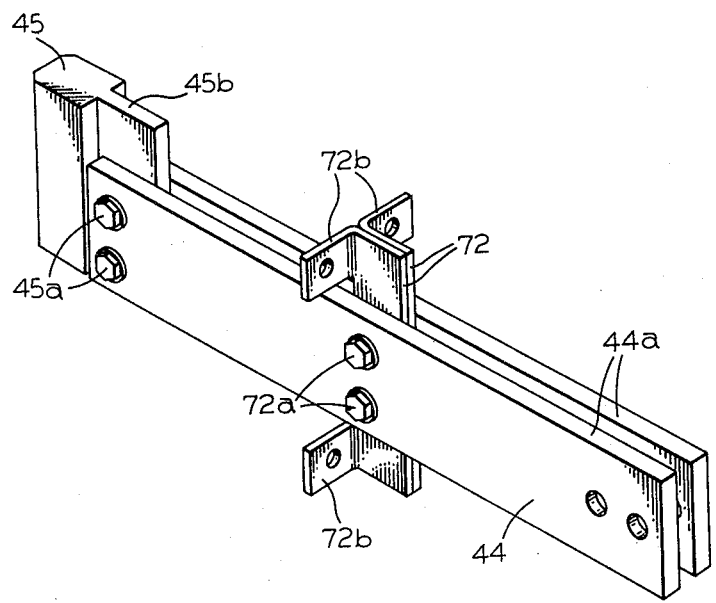
FIG. 10 is a perspective view of one of the runbacks utilized in the switchgear of FIG. 1.

To isolate the rearward extensions of runbacks 44 from the riser busbars, the base is integrally formed with a rearwardly extending, rectangular sleeve 70 outstanding from the floor 62a of each channel 62, as seen in FIGS. 7, 8 and 9. Riser bus clearance for these sleeves is afforded by the gaps 56e in the copper busbar webs 56b (FIG. 11) or the openings 58d in the aluminum busbar webs 58b (FIG. 12). An integral, vertically oriented partition 70a divides the sleeve interior into two rectangular passageways 70b, as best seen in FIGS. 7 and 9, which open into associated depression 42 in the front side of base 32. As seen in FIG. 10, each runback is constituted by a pair of copper bars 44a whose forward terminations are clamped by bolts 45a in electrical connection with an intervening tongue 45b integrally formed with male stab 45. At an appropriate intermediate point, a pair of brackets 72 are clamped together between the runback bars by bolts 72a to thus create a runback assembly with bars 44a secured in closely spaced, parallel relation. Each bracket is equipped with a pair of laterally turned, apertured ears 72b which rest on four pedestals 42a outstanding from the floor of each depression 42, as best seen in FIG. 3, when the runback assemblies are inserted through sleeves 70 from the front side of the base. As seen in FIG. 8, self-tapping screws 42c are driven into blind holes 42b formed in these pedestals to clamp ears 72b thereto and, in turn, secure the runback assemblies to base 32.

The utilization of a pair of bars in each runback 44 is seen to promote more secure support of the runbacks by the base; the sleeve partitions 70a being a significant factor in this regard. Moreover, greater conductor surface area is created to afford increased current carrying capacity without having to enlarge the vertical dimension of the runback conductors. As seen in FIG. 10, the rearward terminations of the runback bars 44a are apertured for bolted electrical connection with cable bus connectors (not shown), which, incidentally, further serve to secure the bars in parallel, closely spaced relation.

Figure 13:
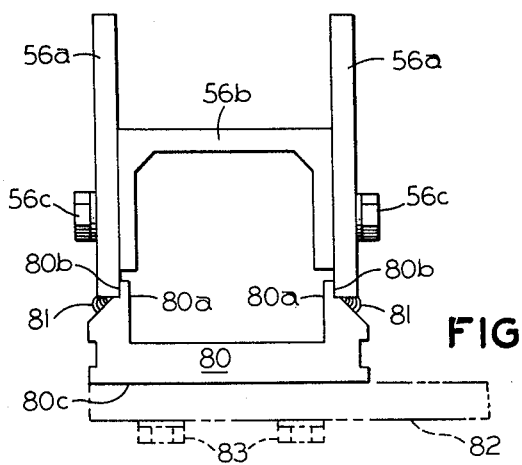
FIG. 13 is a plan view of an electrical joint between a horizontal busbar and the riser busbar of FIG. 11.
Figure 14:
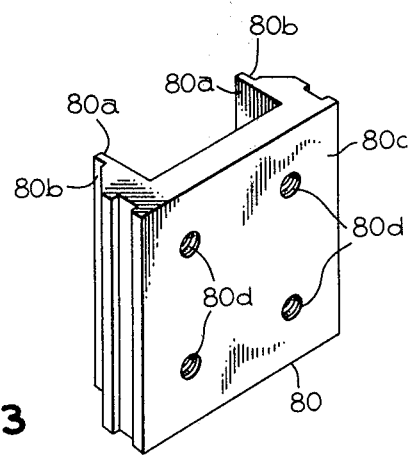
FIG. 14 is a perspective view of the power connector utilized in the bus joint of FIG. 13.
Figure 15:
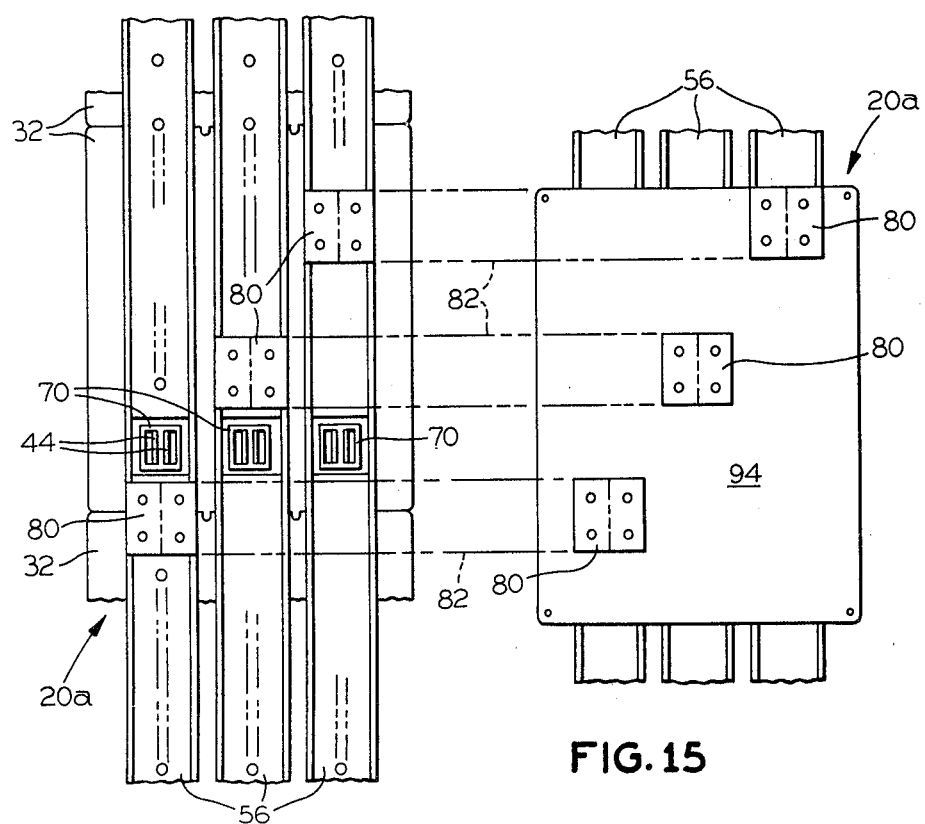
FIG. 15 is a simplified elevational view illustrating the horizontal bus runs interconnecting adjacent switchgear vertical sections.

In FIGS. 13 and 14 there is illustrated a power connector 80 which is utilized to make the electrical connections or bus joints between the copper riser busbars 56 of FIG. 11 and horizontal busbars 82 which in FIG. 15 are seen to run between corresponding riser busbars of adjacent switchgear vertical sections 20a (FIG. 1) and to a power source (not shown) feeding the switchgear sections in parallel. The connectors are generally U-shaped having legs 80a appropriately relieved, as indicated at 80b, to seat on the rearward edges of the riser bus flanges 56a. Weld fillets 81 are then laid down to join the connector legs with the riser bus flanges pursuant to creating a welded electrical joint between the power connector and the riser busbar. The planar rearwardly facing surface 80c of the power connector is provided with tapped bores 80d accommodating bolts 83 for effecting a bolted electrical joint between the power connector and a horizontal busbar 82. In the case of the aluminum riser busbars, electrical joints with the horizontal busbars may be effected in the manner disclosed in commonly assigned, U.S. Pat. No. 4,298,771 the disclosure of which is specifically incorporated herein by reference.

Figure 16:
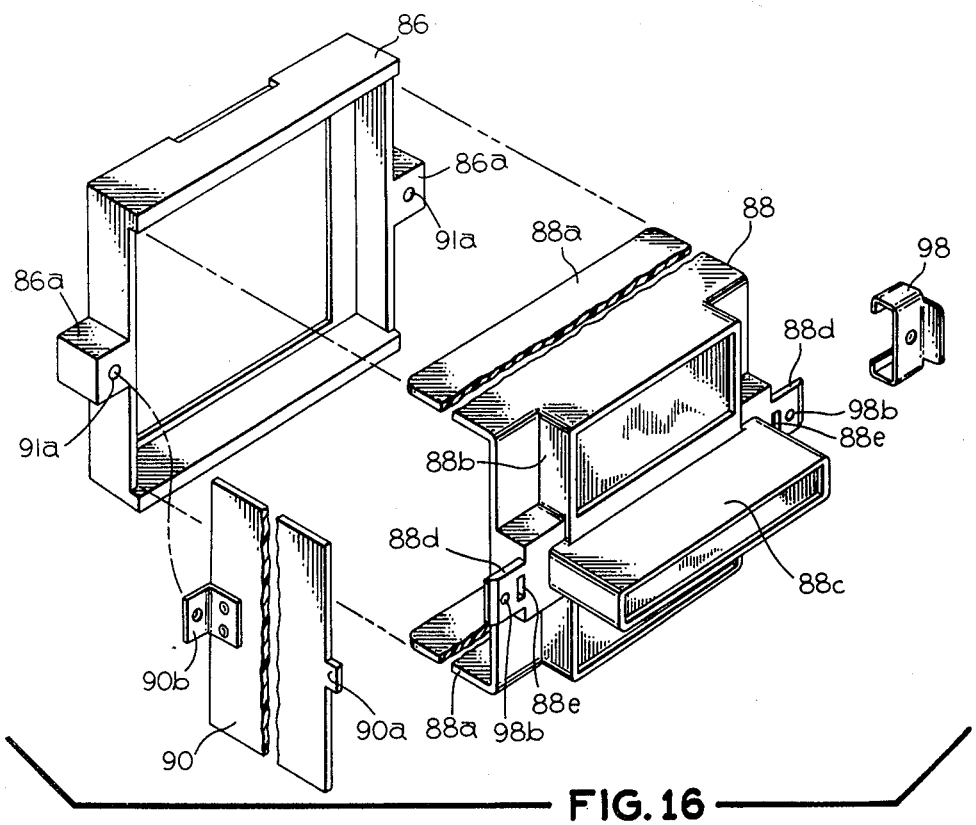
FIG. 16 is an exploded perspective view of an isolating enclosure for the bus joint of FIG. 13.
Figure 17:
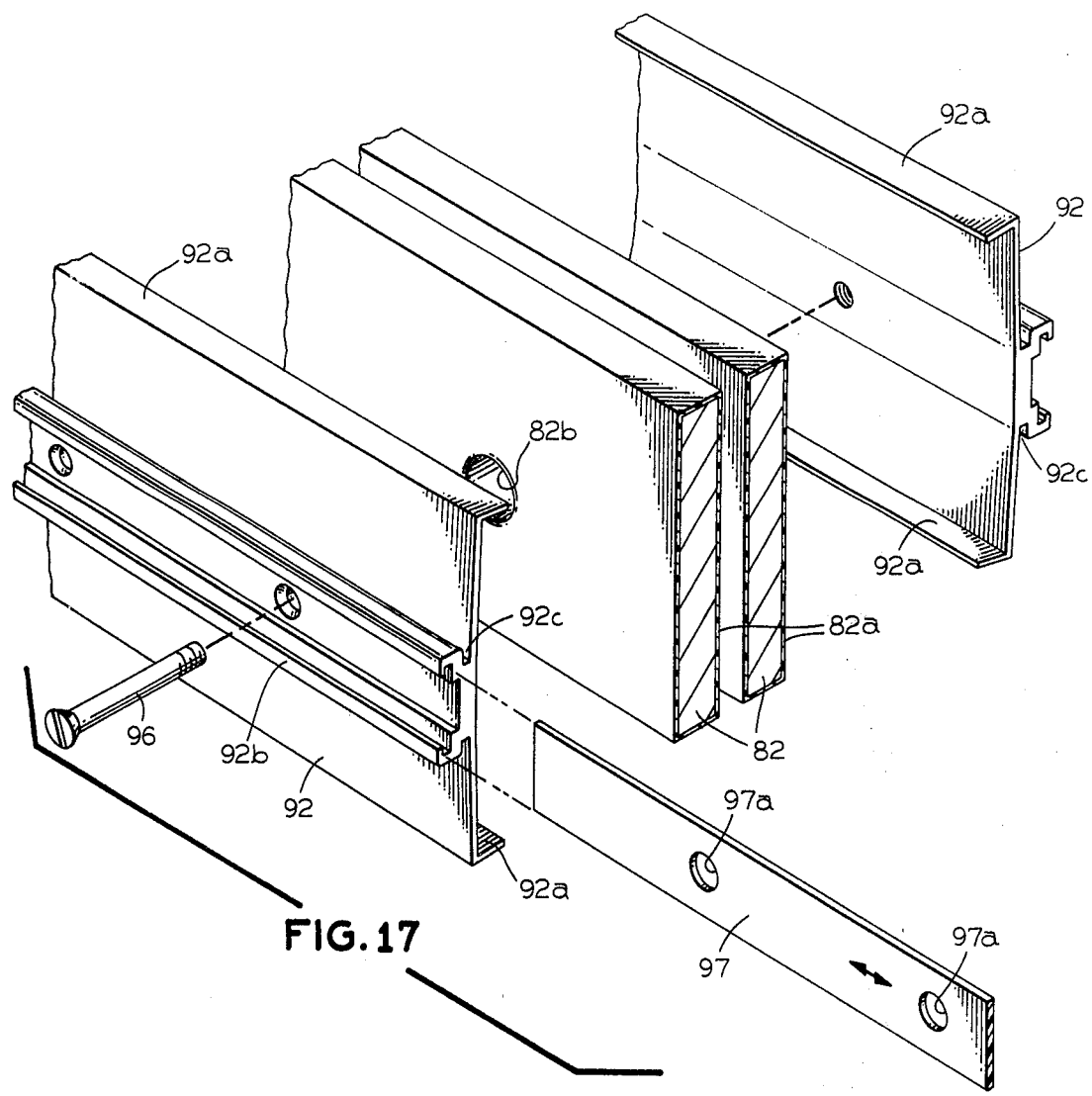
FIG. 17 is an exploded, fragmentary perspective view illustrating the assembly of isolating barriers to the horizontal bus runs of FIG. 15.
Figure 18:
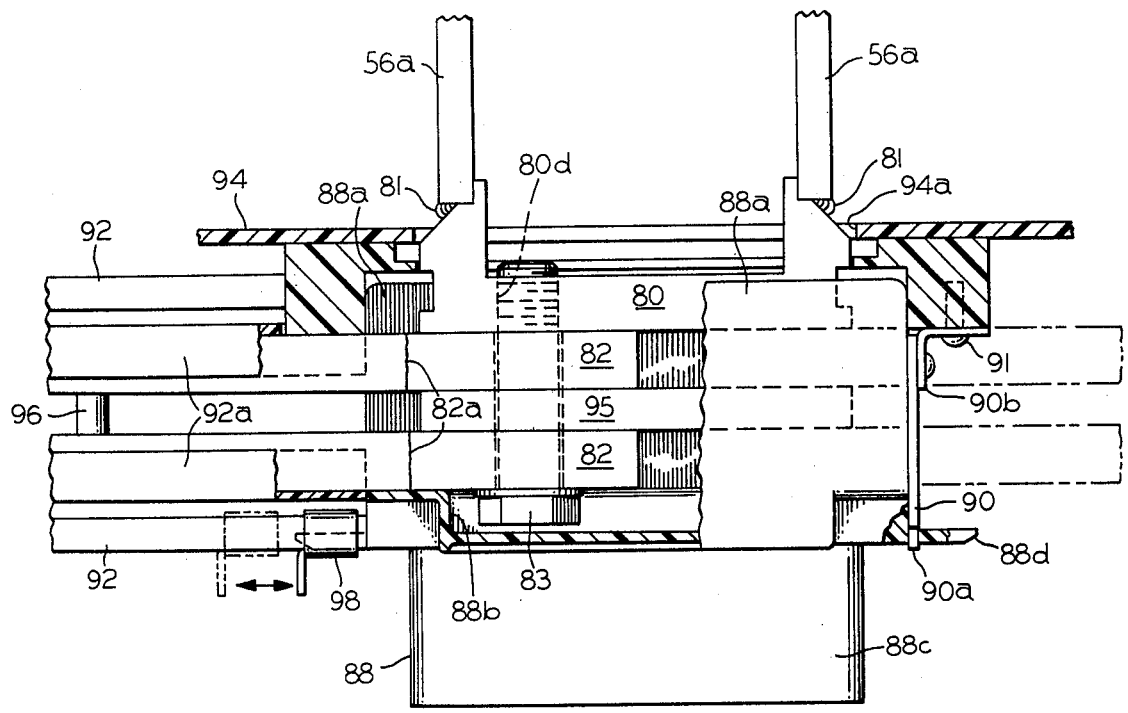
FIG. 18 is a plan view, partially broken away, of the bus joint of FIG. 13 as adapted with the isolating enclosure of FIG. 16 and a horizontal bus run as adapted with the isolating barriers of FIG. 17.
Figure 19:
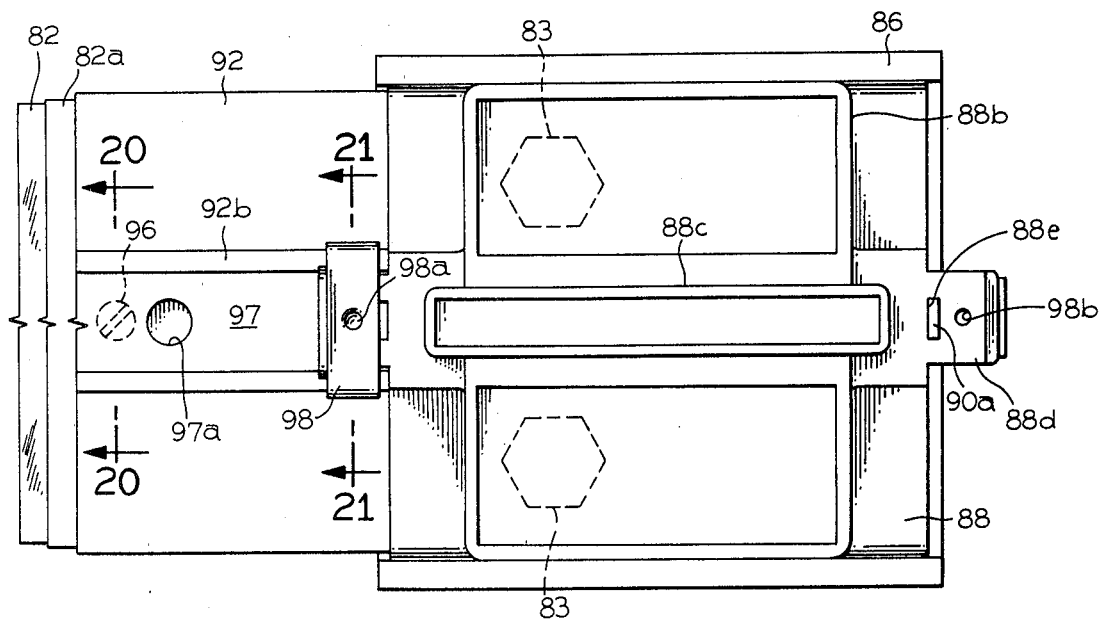
FIG. 19 is an elevational view of the isolated bus joint and horizontal bus run of FIG. 18.

To isolate the riser-horizontal bus joints from contact by humans and foreign objects, an insulative enclosure therefor, seen in FIGS. 16, 18 and 19, is provided. This enclosure is constituted by a molded rectangular collar 86, a molded cover 88, and, in those situations where a horizontal bus run terminates at a particular power connector, an end panel 90. To protect and isolate the horizontal bus runs between power connectors, a pair of elongated, insulative barriers 92, best seen in FIG. 17, are assembled in partially enclosing relation thereto. Finally, to isolate the riser busbars, a barrier sheet 94, seen in FIG. 15, is secured to the back side of each base 32 to close off the riser bus channels 62. Rectangular openings 94a (FIG. 18) in the barrier sheet provide clearance for the power connectors 80 so that the welded joints between the power connectors and the riser busbars may be made before the barrier sheet is secured to the base.

Before the joint between the power connectors and the horizontal busbars 82 are made, collars 86 of the bus joint enclosures are slipped over the power connectors. Once the bus joints are made, covers 88 are applied. From FIGS. 16 and 18, it is seen that the upper and lower skirts 88a of the cover underlap the upper and lower sidewalls of the collar to fully isolate the bus joint from above and below. The length of these skirts is made sufficient to isolate bus joints involving double-bar horizontal bus runs, as seen in FIG. 18. A conductive spacer 95 is incorporated in the bus joint to maintain the horizontal busbars in closely spaced, parallel relation for high ampacity, cool running performance. The face of the cover is formed having a rectangular cavity 88b to afford clearance for the heads of the joint bolts 83. Also molded into the cover face is a rectangular, horizontally elongated, hollow extension 88c which serves to accommodate the projection flange of the aluminum power connector utilized in the bolted-welded aluminum bus joint of the above-noted U.S. Pat. No. 4,298,771. Extension 88c also serves as a convenient handle for safely removing the cover for in-service joint inspection. To accommodate those situations where the horizontal bus run terminates at a bus joint, collar 86 is molded with opposed, laterally extending ears 86a, while the cover is molded with opposed, laterally extending tangs 88d having a slot 88e therein. Panel 90 is equipped with a projection 90a, which is inserted in this tang slot, and an L-shaped bracket 90b, which is apertured to receive a screw 91 (FIG. 18) threaded into a bore 91a provided in collar ears 86a. The panel 90, thus assembled to the bus joint enclosure, effectively closes off the otherwise open side of the enclosure beyond the horizontal bus run termination to isolate the bus joint from inadvertant human contact.

Figure 20:
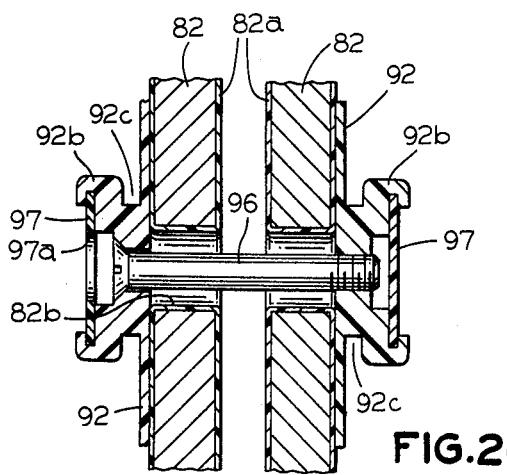
FIG. 20 is a sectional view taken along line 20—20 of FIG. 19.

Turning to FIG. 17, except for their terminations, the surfaces of the individual horizontal busbars 82 are coated with a layer 82a of primary insulation which also covers the surfaces of holes 82b punched therein. As seen in FIG. 20, these holes provide clearance for a series of screws 96 serving to clamp barriers 92 against the front and back sides of the horizontal busbars throughout their runs between bus joints. As seen in FIG. 18, the upper and lower skirts 92a of these barriers do not close off the gap between the horizontal busbars so as not to obstruct convection cooling thereof. The primary purpose of these barriers is to protect the busbar primary insulation 82a from impact damage, and thus are preferably formed of high impact resistant plastic material.

The barriers are molded with a co-extensive track 92b configured to slidingly receive an insulative strip 97 effective in concealing screws 96 when positioned with its access holes 97a in non-registry with the screw heads, as seen in FIG. 19.

Figure 21:
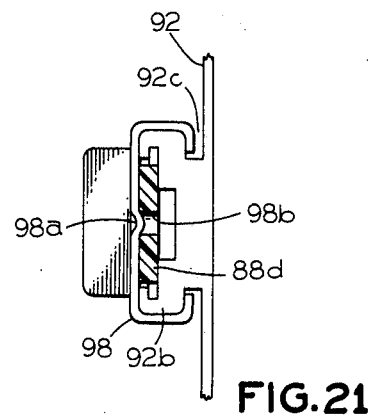
FIG. 21 is a sectional view taken along line 21—21 of FIG. 19.

To interconnect the horizontal bus run barriers with the bus joint enclosure, barrier track 92b is formed with opposed undercuts 92c (FIGS. 17 and 21) serving to slidingly mount a clip 98, also seen in FIGS. 18 and 19. With joint enclosure cover 88 in place, its tangs 88d are received in the recessed portion of tracks 92b on barriers 92 to each side of the bus joint. The clips are then slid toward the bus joint to capture the tangs and hold cover 88 in place. To preserve the captive positions of the clips, they are dimpled, as indicated at 98a in FIG. 21, for detenting engagement with holes 98b molded into the tangs.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described our invention, what we claim as new and desire to secure by Letters Patent is:

1. An insulating-isolating barrier system for electrical switchboards and the like, said system comprising, in combination:
    a plurality of modular, insulative bases assembled in end-to-end vertical relation to a switchboard frame, said bases including a plurality of side-by-side channels in which switchboard riser busbars are individually supported;
    an insulative barrier panel secured to each said base to close off said channels and isolate said riser busbars therein, at least one of said panels having apertures therein individually accessing said riser busbars for electrical connection with separate power connectors, said power connectors making bus joints between separate runs of horizontal busbars and said riser busbars;
    separate pairs of elongated, insulative barrier members clamped in semi-embracing relation with said horizontal busbar runs extending between said bus joints; and
    a joint enclosure for each said bus joint, said enclosure including
        an insulative collar embracing said power connector; and
        a removable, insulative cover mating with said collar to envelop said bus joint thereat, each said bus joint enclosure cover includes a frontal wall and integral therewith separate upper and lower substantially rectangular skirts disposed in lapped relation with said collar.

2. The barrier system defined in claim 1, wherein each said bus joint enclosure further includes a separate, insulative side panel attached to said collar and cover to close off a side of said enclosure otherwise left open by the absence of said barrier member pair due to the termination of a horizontal bus run at the bus joint thereat.

3. The barrier system defined in claim 1, which further includes means selectively coupling each bus joint enclosure with the barrier member pairs associated with the horizontal bus runs entering and leaving the bus joint thereat.

4. The barrier system defined in claim 3, wherein each said bus joint enclosure cover includes opposed horizontally extending tangs and at least the outer one of said pair of barrier members includes a coextensive molded track, said coupling means comprising a clip slidingly mounted on said tracks of said outer barrier members to each side of said cover, said clips being shiftable into engaging relation with said cover tangs.

5. The barrier system defined in claim 4, wherein said outer barrier member molded tracks additionally slidingly receive insulative strips for concealing the heads of screws clamping said barrier member pairs to said horizontal bus runs.

* * * * *